US010503485B2

(12) United States Patent
Hoffmann et al.

(10) Patent No.: US 10,503,485 B2
(45) Date of Patent: Dec. 10, 2019

(54) METHOD AND SYSTEM FOR GENERATING PROGRAM CODE

(71) Applicant: dSPACE digital signal processing and control engineering GmbH, Paderborn (DE)

(72) Inventors: Andreas Hoffmann, Paderborn (DE); Wolfgang Trautmann, Paderborn (DE); Frank Luenstroth, Delbrueck (DE); Volker Straetgen, Bad Wuennenberg (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 161 days.

(21) Appl. No.: 15/827,234

(22) Filed: Nov. 30, 2017

(65) Prior Publication Data
US 2019/0163452 A1 May 30, 2019

(51) Int. Cl.
*G06F 9/44* (2018.01)
*G06F 8/35* (2018.01)
*G06F 8/34* (2018.01)

(52) U.S. Cl.
CPC . *G06F 8/35* (2013.01); *G06F 8/34* (2013.01)

(58) Field of Classification Search
CPC ........................................................ G06F 9/44
See application file for complete search history.

(56) References Cited

U.S. PATENT DOCUMENTS 7,124,407 B1 * 10/2006 Wallman ............. G06F 9/45504
717/154
7,480,642 B2 * 1/2009 Koono ..................... G06N 5/00
706/46

(Continued)

FOREIGN PATENT DOCUMENTS

EP 2 881 858 B1 4/2016

OTHER PUBLICATIONS

Hanselmann et al., "Production Quality Code Generation from Simulink Block Diagrams," Proc. of 1999 IEEE Int'l Symp. on Comp.-Aided Contol Sys. Design, pp. 213-218 (Aug. 1999).

(Continued)

*Primary Examiner* — Jae U Jeon
(74) *Attorney, Agent, or Firm* — Muncy, Geissler, Old & Lowe, P.C.

(57) ABSTRACT

A method for generating program code based on one or more blocks of a block diagram in a technical computing environment, an identifier being assigned to at least one, preferably each, of the one or more blocks of the block diagram. A processor opens the block diagram in the model editor, converts the block diagram to an intermediate representation using the code generator, wherein the conversion comprises checking if a replacement condition is fulfilled for a current block in the block diagram. Checking the replacement condition includes verifying that a predefined functional code unit is assigned to the identifier of the current block, in that case changing the block to a placeholder containing input/output-definitions but no functionality. The processor then converts the intermediate representation to program code, the conversion comprising adding a predefined functional code unit from the data definition tool to the definition code corresponding to the placeholder block.

12 Claims, 5 Drawing Sheets

(56) References Cited

U.S. PATENT DOCUMENTS

| | | |
|---|---|---|
| 8,701,081 B2 | 4/2014 | Carrick et al. |
| 2015/0095277 A1* | 4/2015 | Tristan .................. G06N 7/005 706/52 |
| 2015/0160940 A1 | 6/2015 | Hufnagel et al. |

OTHER PUBLICATIONS

DSPACE, "Getting Ideas on the Road Faster," Elektronic Automotive, pp. 1-6 (Mar. 2012).

Hufnagel et al., "Prototyping Directly on the Target," dSPACE and Design & Elektronik, pp. 1-4 (Jan. 2012).

* cited by examiner

METHOD AND SYSTEM FOR GENERATING PROGRAM CODE

BACKGROUND OF THE INVENTION

Field of the Invention

The present invention relates to a method and computer system for automatically generating code from block diagrams, the code, for example, being used in electronic control units.

Description of the Background Art

Electronic control units (ECUs) are ubiquitous especially in automotive applications; generally, they may contain a processor, for example, a microcontroller, one or more sensor interfaces and one or more circuits to control an actuator. Current parameters of a physical process are determined using the signals of the one or more sensors connected to the sensor interfaces. Based on a predefined control strategy, the processor may control the one or more circuits to apply the actuators in order to influence the physical process. In a particular example, an ECU may be used to perform anti-lock braking, with a sensor measuring the wheel velocity and a magnetic valve reducing the pressure in the corresponding wheel brakes.

In order to speed up the development process for ECUs, control strategies are developed using block diagrams in a technical computing environment (TCE), which allows for tracing the temporal behavior of a physical system described by one or more blocks in the block diagram. One particular example of a TCE is MATLAB/Simulink of The MathWorks.

The document "Production Quality Code Generation from Simulink Block Diagrams", Proceedings of the 1999 IEEE International Symposium on Computer Aided Control System Design, Kohala-Coast, Hawai'i, USA, by H. Hanselmann et al. describes a system for automatically generating production code based on a block diagram containing one or more blocks that specify the functionality of the program. The program may be a control program for an ECU, the control program implementing the desired control strategy.

When an existing ECU can be used as a basis for developing a new ECU or a single function of an existing control program needs to be modified, a method known as bypassing is commonly used. Generally, the ECU remains in the control loop and the existing control program is executed; however, the original code for the selected function is bypassed. The sensor inputs and/or current variable values of the ECU are collected and used as an input for a new function; the output values of the new function are then transferred to the respective addresses on the ECU.

In so-called external bypassing, a rapid control prototyping (RCP) system running the new function is connected to the ECU. While this allows for computationally expensive new functions, it cannot provide an answer on the question if the new function can be executed in real-time on the existing ECU.

Internal bypassing, also known as on-target bypassing, refers to running the new function on the microcontroller in the ECU. The ECU still executes any other function that is present in the original control program. The patent EP 2881858 B1, "Method for modifying the software in the memory of an electronic control device", discloses a method for internal bypassing; the original binary code of the control program is modified to accommodate service functions that are executed before and after the selected function. Internal bypassing requires code specifically adapted to the hardware and software of the current ECU. Therefore, even when a block diagram of the control program exists, cumbersome manual adaptions are necessary.

The U.S. Pat. No. 8,701,081 B2, "Hardware specific code generation", describes a method for adapting functions with a specific argument pattern to a processor architecture of the target platform based on a hardware-specific library. This allows e.g. for replacing all addition operators with integer arguments by a hardware-specific function. However, for internal bypassing, the generated code needs to be adapted to the current version of the ECU firmware.

Thus, improved methods for generating program code, in particular a flexible way for generating program code adapted to a specific hardware and software environment, are desired.

SUMMARY OF THE INVENTION

It is therefore an object of the present invention to provide a method and computer system for automatically generating program code from a block diagram comprising a detailed implementation of the program.

In an exemplary embodiment of the invention, a computer-implemented method for generating program code based on one or more blocks of a block diagram in a technical computing environment is provided. An identifier is assigned to at least one or each of the one or more blocks of the block diagram. The technical computing environment comprises a model editor, a data definition tool and a code generator, the data definition tool comprising at least one functional code unit and a corresponding identifier; the technical computing environment is being executed by at least one processor of a host computer. The inventive method comprises opening the block diagram in the model editor and converting the block diagram to an intermediate representation using the code generator. Before, during or after the conversion, the processor checks if a replacement condition is fulfilled for a current block in the block diagram, and when the replacement condition is fulfilled, the processor replaces the current block by a placeholder containing input/output-definitions but no functionality. Checking if the replacement condition is fulfilled comprises verifying that a predefined functional code unit is assigned to the identifier of the current block. The inventive method further comprises converting the intermediate representation to program code, wherein the processor adds the predefined functional code unit assigned to the identifier of the current block from the data definition tool to a definition code corresponding to the placeholder.

The steps of the inventive methods may be carried out by a processor running different software components on a host computer, the software components using the mechanisms of the technical computing environment or of the operating system of the host computer to exchange data and/or cause the execution of one or more further software components. The host computer may be realized as a single standard computer comprising a processor, for example, a high-speed general-purpose microprocessor, a display device and an input device. Alternatively, the host computer system may comprise one or more servers comprising one or more processing elements, the servers being connected to a client comprising a display device and an input device via a network.

Therefore, the technical computing environment may be executed partially or completely on a remote server, such as in a cloud computing setup. A graphical user interface of the technical computing environment may be displayed on a portable computing device, for example, a computing device with a touch screen interface. In this case, it is particularly advantageous when the computations for executing the block diagram are carried out on a remote server. The technical computing environment may comprise a graphical user interface for modifying the block diagram and a simulation engine for executing the block diagram, so that the dynamical system described by the block diagram can be simulated. The block diagram may comprise multiple blocks with input and/or output signals that are connected to output and/or input signals of other blocks. Each block may be an atomic functional unit or may be a hierarchical block that is composed of a plurality of subordinate blocks.

Advantageously, the inventive method provides a mechanism that allows for selectively replacing blocks without the need to apply changes to the block diagram. For instance, when the block diagram contains a newly introduced block that is unknown to the production code generator, it is not necessary to construct a replacement based on supported blocks. Instead, a predefined functional code unit can be introduced in the data definition tool to implement the functionality of the new block in the production code. The replacement is transparent to the user. Because the block diagram remain unchanged, the behavior of the generated production code can in general be verified against the results of a model-in-the-loop simulation. As the intermediate representation of the control program only contains the interface definition of the code unit, such as input arguments and output variables, any version of the predefined code unit can be combined with any version of the production code generator. The predefined functional code unit is simply introduced into the generated production code. New versions of the functional code unit can be used in the control program without any changes to the production code generator.

The identifier may be the name of a block. The block name may be a fixed name or it may be determined based on a naming macro that e.g. determines the block name based on the hierarchical placement in the block diagram. The name of a subordinate block may contain the name of the hierarchically superordinate block such as a subsystem comprising the block. The name of the block may be created automatically using a naming expression; for a hierarchical block diagram, the name of a block may depend on the position of the block in superordinate blocks. For instance, a naming expression such as $S_$B may be used, where $S evaluates to the name of the superordinate block and $B evaluates to the name of the current block. The identifier of a block designates a location of the block. The name of the current block may depend both on the type of the block and the number of other blocks of the current type in the current subsystem. The name of a block may also be at least in part chosen arbitrarily by a user; it may comprise fixed portions entered via a user interface.

The data definition tool allows for attaching multiple functional code units to the same block. So the program may be used in different electronic control units without changes to the underlying block diagram. It is also possible to attach sets of parameters to the identifier of a block and to generate adapted code based on these parameters by using an auxiliary code generator. This allows for easily adapting the addresses of service functions for accessing variables in the ECU firmware based on the current software/firmware version. Instead of dynamically invoking the auxiliary code generator, it may also be used in a preparative step to generate the functional code units to be stored in the data definition tool.

Advantageously, because the functional code unit is assigned to the identifier of a specific block, the generated code can be adapted based on the local context of the block. Thus, when a block from a block library is used multiple times in the block diagram, the first instance of the library block may be replaced by a functional code unit optimized for speed and the second instance of the library block may be replaced by a functional code unit optimized for code size. This allows for generating size-optimized code for most parts of the block diagram and using computation-speed optimized code in that section of the code that is repeatedly executed.

In an embodiment of the invention a method is provided for generating program code based on one or more blocks of a block diagram in a technical computing environment, an identifier being assigned to at least one or each, of the one or more blocks of the block diagram. The technical computing environment comprises a model editor, a data definition tool and a code generator, the data definition tool comprising at least one functional code unit and a corresponding identifier; the technical computing environment is being executed by at least one processor of a host computer. The inventive method comprises opening the block diagram in the model editor and converting the block diagram to an intermediate representation using the production code generator. Before, during or after the conversion, the processor checks if an enhancement condition is fulfilled for a current block in the block diagram, wherein checking if the enhancement condition is fulfilled comprises verifying that a predefined functional code unit is assigned to the identifier of the current block. When the enhancement condition is fulfilled, the processor adds input/output-definitions to the intermediate representation of the block. The inventive method further comprises converting the intermediate representation to program code. As part of the conversion, the processor adds a predefined functional code unit from the data definition tool to a definition code corresponding to the input/output-definitions. The definition code is generated as an enhancement to the code corresponding to the block functionality.

Advantageously, the inventive method provides a mechanism that allows for selectively adding code to a control program without the need to apply changes to the block diagram. The predefined functional code unit may be added to the code of a block. When the block is a hierarchical block, the predefined functional code unit may be introduced as if a further subordinate block had been added; this could also be named a virtual block that provides a functionality for the generated code. The predefined functional code unit may be added to the production code generated from any block, irrespective whether it is a hierarchical block or a basic block. For instance, the state of an external variable may be initialized by the predefined functional code.

In an embodiment, checking if a replacement condition or an enhancement condition may be fulfilled additionally comprises determining that a particular operation mode of the code generator is selected. For instance, the production code generator may have a mode for generating code that is compliant to a particular standard such as AUTOSAR or MISRA, or a mode for generating simulation code. In case of different operation modes, the replacement or enhancement may be only suitable for a particular operation mode; also, a first functional code unit may be used for a first operation mode a second functional code unit may be used for a second operation mode of the production code generator.

In an embodiment, checking if a replacement condition or an enhancement condition may be fulfilled additionally comprises determining that the current block is a block of a predefined type. Generally, a plurality of additional conditions may be verified before replacing or enhancing a block, such as verifying that the current block has both the identifier and the block type indicated in the replacement condition. Further, a plurality of different replacement conditions or enhancement conditions may be checked; when a plurality of different functional code units and corresponding identifiers are stored in the data definition tool, the functional code unit to be included in the program code for the current block is advantageously chosen depending on which condition is fulfilled.

In an embodiment, each block of the one or more blocks being the basis for the generation of program code can be subsequently treated as current block for which the replacement condition or the enhancement condition is checked. Advantageously, each block whose identifier matches a predefined identifier in the data definition tool is replaced or enhanced by the corresponding functional code unit. The replacement or enhancement may only be performed if any additional condition such as a suitable operation mode of the code generator is fulfilled.

In an embodiment, opening the block diagram in the model editor can comprise adapting the block diagram based on at least one predefined block adaption rule, wherein applying the block adaption rule to a first block comprises replacing the first block by a predefined second block in the block diagram and/or setting at least one property of the first block to a new value. A single first block may be replaced by a predefined plurality of blocks, i.e. the second block may be a hierarchical block comprising a plurality of subordinate blocks. This provides for even more flexibility in generating code for the block diagram; some blocks that are not compatible with the code generator may be replaced by functionally equivalent blocks in the block diagram prior to generating code.

In an embodiment of the invention, at least one block is taken or copied from a block library, and the block library comprises a replacement description that comprises a functional code definition assigned to the block and a corresponding interface description. Prior to generating code, a replacement condition is determined based on the replacement description, and the functional code unit is determined based on the functional code definition and stored in the data definition tool. When blocks from a block library are provided with a replacement description, any block diagram containing blocks from the library may be converted to production code with no or minimal manual intervention by the user. Block library and replacement description may be integrated into a single file, or the replacement description may be provided as additional file, for example, a XML file. The production code generator may comprise a tool for parsing the replacement description and adding the determined information to the data definition tool. Instead of a literal specification of the functional code unit, parameters for an auxiliary code generator may be stored in order to generate the adapted functional code unit. Alternatively, the auxiliary code generator may be invoked in a preparative step for generating the functional code units to be stored in the data definition tool.

In an embodiment of the invention, a method for adapting an electronic control unit is provided that is carried out by a processor of a host computer connected to the electronic control unit. The host computer may be realized as a computer system comprising a first computer running the technical computing environment and a second computer connected to the electronic control unit, wherein the first and second computers are at least temporarily connected by a data network. The computer-implemented method for adapting an electronic control unit comprises receiving a binary executable file of the electronic control unit and a description file containing function addresses, function call parameters and function output parameters, and generating, using an interface generator, a service function for the binary executable file, wherein address and selectable parameters of the service function are chosen depending on the description file. The functionality of the electronic control unit is enhanced or changed by additional program code, the additional program code being generated based on one or more blocks of a block diagram in a technical computing environment and compiled using a compiler adapted to the electronic control unit. The inventive method further comprises combining the binary executable file, the service function and the compiled additional code to a modified binary executable file, and transferring the modified binary executable file to the electronic control unit.

Advantageously, the method for adapting an ECU allows for an easy testing of new control functions using on-target bypassing. The existing binary file of the ECU firmware and a description file comprising address information that allows for calling existing functions and reading or writing existing variables in the ECU firmware. A new control function can be designed and simulated comfortably as a block diagram in a technical computing environment. The designed block diagram is automatically processed in a production generator to produce additional program. Based on the address information and properties of the relevant part of the block diagram, such as input/output variables, an interface generator produces a service function and glue code for seamlessly combining the different parts. By using a cross compiler, binary code for the ECU may be created on any computer. The different parts are automatically linked together and the resulting binary file is transferred to the ECU, for example, the binary file is stored in a nonvolatile memory of the ECU. When the ECU is started, measurements may be performed in situ by a control and measurement computer connected directly or via an adapter to the ECU.

In an embodiment, the additional program code can be generated based on a block diagram, wherein at least one block of the block diagram is replaced by a predefined functional code unit or wherein at least one block of the block diagram is enhanced by a predefined functional code unit.

In an embodiment, the additional program code can comprise fixed-point operations, for example, exclusively fixed-point operations. By using a production code generator, the new control function of the ECU may be directly implemented as fixed-point (FXP) code largely identical to the final code used in a production ECU. This allows for more meaningful testing, particularly any error introduced by converting floating-point (FLP) calculations useful for simulation models to FXP code useful for ECU firmware may directly be found in on-target bypassing.

An aspect of the invention also concerns a non-transitory computer readable medium containing instructions that, when executed by a microprocessor of a computer system, cause the computer system to carry out the inventive method as described above or in the appended claims.

In a further aspect of the invention, a computer system is provided which comprises a processor, a random access memory, a graphics controller connected to a display, a serial interface connected to at least one human input device, and a nonvolatile memory, for example, a hard disk or a solid-state disk. The nonvolatile memory comprises instructions that, when executed by the processor, cause the computer system to carry out the inventive method.

The processor may be a general-purpose microprocessor that is customary used as the central processing unit of a personal computer or it may comprise one or a plurality of processing elements adapted for carrying out specific calculations, such as a graphics-processing unit. In alternative embodiments of the invention, the processor may be replaced or complemented by a programmable logic device, such as a field-programmable gate array, which is configured to provide a defined set of operations and/or may comprise an IP core microprocessor.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
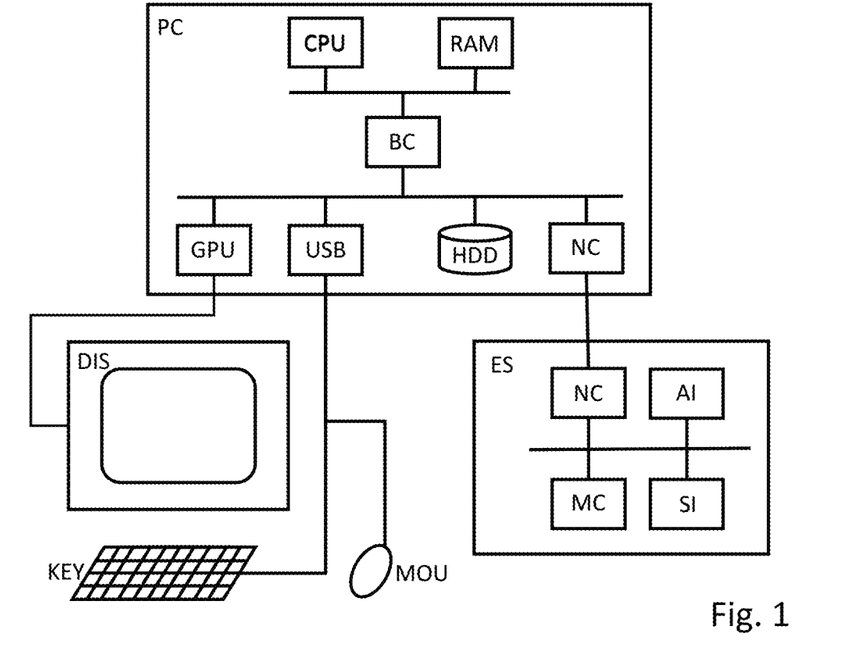
FIG. 1 is an exemplary diagram of a computer system.

FIG. 1 illustrates an exemplary embodiment of a computer system. The shown embodiment comprises a host computer PC with a display DIS and human interface devices such as a keyboard KEY and a mouse MOU; further, an embedded system ES is depicted, which may be used for internal bypassing.

The host computer PC comprises at least one processor CPU with one or multiple cores, a random access memory RAM and a number of devices connected to a local bus (such as PCI Express), which exchanges data with the CPU via a bus controller BC. The devices comprise e.g. a graphics-processing unit GPU for driving the display, a controller USB for attaching peripherals, a non-volatile memory HDD such as a hard disk or a solid-state disk, and a network interface NC. For example, the non-volatile memory can comprise instructions that, when executed by one or more cores of the processor CPU, cause the computer system to carry out a method according to one of the claims.

The embedded system ES comprises a network interface NC, an actuator interface AI and a sensor interface SI as well as a microcontroller MC. As an alternative or addition to the microcontroller MC, the embedded system ES may comprise a programmable logic device such as a field-programmable gate array (FPGA). The programmable logic device may contain a hardwired digital signal processor and it may be configured to comprise an IP core microprocessor. The embedded system ES can be connected to the personal computer PC via the network interface NC, which may e.g. be of USB, RS-232 or Ethernet type. The embedded system may comprise a non-volatile memory that comprises instructions to be carried out by the microcontroller or a configuration to be loaded on the programmable logic device, so that a firmware may be permanently stored.

In an embodiment of the invention, the host computer may comprise one or more servers comprising one or more processing elements, the servers being connected to a client comprising a display device and an input device via a network. Thus, the technical computing environment may be executed partially or completely on a remote server, such as in a cloud computing setup. A personal computer may be used as a client comprising a display device and an input device via a network. Alternatively, a graphical user interface of the technical computing environment may be displayed on a portable computing device, for example, a portable computing device with a touch screen interface or a virtual reality device.

The embedded system may be an electronic control unit (ECU) specially adapted to perform specific control functions, so that specific sensor and actor interfaces may be present, but a standard network interface may be missing. In that case, an adapter may be used for connecting a control computer to the electronic control unit. The control computer may be a laptop running mainly a measurement program for controlling the ECU and logging data. Preparing the ECU may be performed using the host computer, and measurements may be carried out on site using only the control computer. In the following, only an embodiment where all the software is installed on the host computer will be described. A person skilled in the art will recognize that a plurality of different computer systems may be used sequentially or in parallel.

For some aspects of the present invention, the presence of an embedded system may not be necessary.

Figure 2:
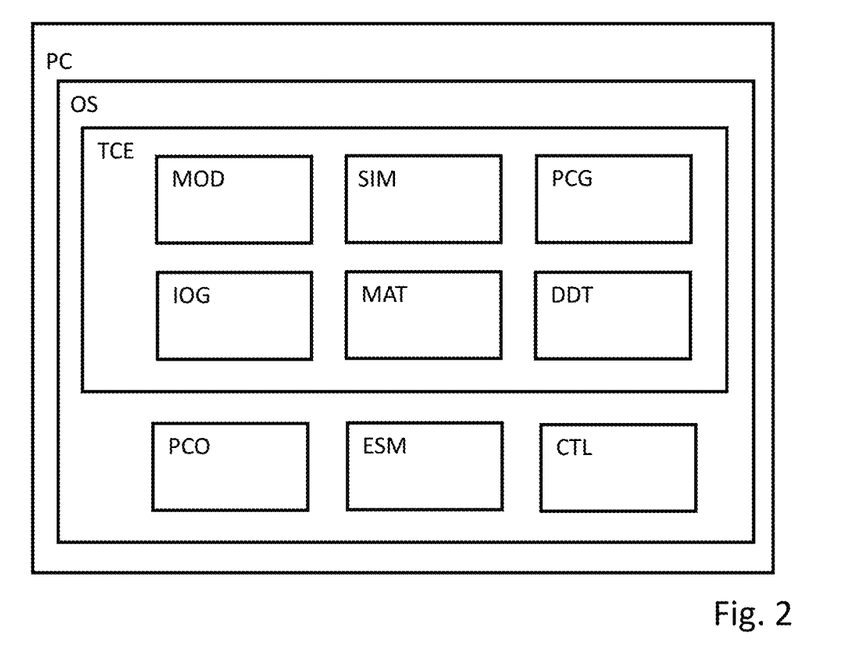
FIG. 2 is an exemplary diagram of software components in a computer system.

FIG. 2 displays an exemplary embodiment of the software components being executed on a computer system, which may be realized as a host computer PC with a standard microprocessor that runs a standard operating system OS such as Microsoft Windows or a Linux distribution.

On the host computer PC, a technical computing environment TCE such as MATLAB/Simulink of The Mathworks may be installed. Other examples of technical computing environments comprise Labview of National Instruments or ASCET of ETAS. The technical computing environment TCE comprises a plurality of software components such as a model editor MOD and a simulation engine SIM. Additionally, the TCE may comprise a mathematical and/or script interpreter MAT that is adapted for carrying out calculations or modifying data. The TCE comprises a production code generator PCG that is adapted to produce production code from a model; further, it comprises a data definition tool DDT. The expression that a software component is comprised in the TCE is intended to encompass the case that the software component uses a specific mechanism of the TCE such as an application-programming interface of the TCE in order to exchange data and/or instructions with other software components in the TCE. For example, a software component may be realized as or comprise an add-on such as a toolbox or a block library for the model editor MOD.

The model editor MOD may provide a graphical user interface for creating and modifying block diagrams that describe the temporal behavior of a dynamic system. Additionally, blocks adapted for describing finite states and conditions for transitions between states may be used to model the dynamic system. A block may describe an atomic operation, such as an arithmetic calculation or a logic expression, or it may represent a subsystem that is described in more detail by an additional or partial block diagram in a subordinate hierarchical level. This need not imply that the partial block diagram is stored in a separate file, but rather that the functionality of a hierarchical block is defined by a plurality of blocks in a subordinate level. Alternatively, it may contain code in a higher-level programming language, for example, a dynamic language intended for mathematical programming, that realizes the block's functionality. Multiple blocks may be connected by signals for the exchange of data. For example, an initial block may receive a signal of type single as input signal, may modify the signal e.g. by adding a constant and may send an output signal of type double to a further block. It may be said that the further block is downstream of the initial block because they are connected by a signal path so that data flows from the initial block to the further block.

The simulation engine SIM may be adapted to execute a block diagram created in the model editor MOD in order to observe the temporal behavior of the dynamic system described by the block diagram. The execution of a block diagram may also be called a model-in-the-loop simulation of the dynamic system and is carried out using high-precision operations in order to observe the behavior more closely and to create reference data.

The production code generator PCG allows for creating production code from one or more blocks in a block diagram. Production code may be optimized for readability, traceability, safety, low-energy consumption, execution speed and/or memory requirements. The code generator can provide a user interface for setting a plurality of options for adapting the customization of the generated code. Customization options may include target-specific optimizations for the microcontroller of the embedded system and enforcing compliance of the generated code to a specific standard, such as the MISRA C guidelines. A particularly preferred production code generator PCG is TargetLink of dSPACE.

The data definition tool DDT provides a local or remote database for storing definitions and parameters as well as an application-programming interface for automatic exchange of the data between different software components. The term "database" can be understood in a broad sense, so that a file with a tree structure may be considered a local database. A data definition tool allows for a clean separation of the model of the dynamic system given in the block diagram from implementation-specific details stored in the database. When a complex model is structured in different sub-models, data in different sub-models may be linked. By storing corresponding information in the data definition tool, these dependencies may be automatically resolved. Additionally, by exchanging data with a software architecture tool, such as SystemDesk of dSPACE, the data definition tool DDT can be used as part of a higher-level tool chain, for example, to generate product code compliant to the AUTOSAR standard. A preferred data definition tool is TargetLink Data Dictionary of dSPACE.

The interface generator IOG is adapted to generate an interface between a new control function and an ECU service function. The generated interface can be based at least in part on information from the data definition tool DDT e.g. concerning the data types of signals received by or output from the new control function.

Other software components such as a production code compiler PCO, an ECU service manager ESM or a control and measurement tool CTL may be installed on the computer. These software components may be interfaced to each other and/or the technical computing environment using standard mechanisms of the underlying operating system OS. The compiler PCO may generate an executable for the microprocessor of the PC or it may generate an object code for the microcontroller of the embedded system. The ECU service manager ESM is adapted to modify an ECU firmware and to write the modified firmware on a nonvolatile memory of the ECU. The control and measurement tool CTL can e.g. be used for observing the value of a signal during execution of the modified ECU software. Depending on the intended use, the observed values may be directly displayed to the user and/or they may be logged in a memory, e.g. in RAM, in a file or a database.

Figure 3:
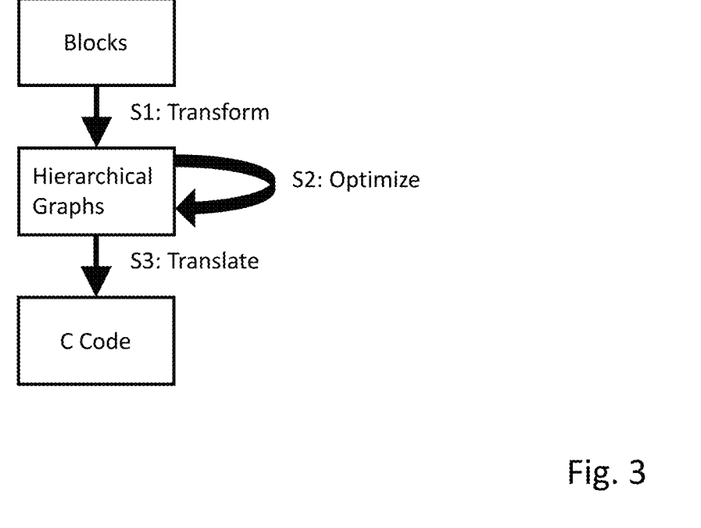
FIG. 3 is an exemplary diagram of a method for generating production code from a block diagram.

FIG. 3 illustrates an exemplary embodiment of the generation of production code from one or more blocks in a block diagram. The following steps may be carried out by a microprocessor on the host computer; alternatively, a client server setup may be used so that computationally expensive steps are carried on a remote server containing a plurality of microprocessors.

In a first step S1, the selected one or more blocks (or, if selected, the entire block diagram) and related input data are transformed to an intermediate representation such as one or more hierarchical graphs. These hierarchical graphs may comprise a data flow graph, a control flow graph and/or a tree structure. Related input data may e.g. be extracted from a database associated with the block diagram. This may encompass situations where elements of the block diagram are created based on information from a data definition tool, or where settings relevant for the production code generation are retrieved from the data definition tool.

In a second step S2, the hierarchical graphs are optimized in order to reduce the number of variables required and/or the number of operations or instructions to be carried out. This optimization may comprise a plurality of intermediate steps on further intermediate representations between block level and production code level. In each step, an initial set of hierarchical graphs or an intermediate language is converted to a modified set of hierarchical graphs or an intermediate language while applying one or more optimization rules. A number of strategies such as constant folding or elimination of dead code may be applied during optimization.

In a third step S3, the optimized intermediate representations such as optimized hierarchical graphs are translated to code in a high-level or low-level programming language, for example, C code. The code may be further optimized in this step and restricted to a subset of the linear or parallel programming language, the control and dataflow structures may be restricted to precisely specified variants, the scope of functions and data may be restricted according to accurately specified rules. Alternatively or in addition, additional information may be added to the code, e.g. in the form of comments, to enhance readability or help in debugging the code.

During or after the code generation, information on the current block diagram or the code generation, especially results of the code generation, may again be stored in the data definition tool. This information may e.g. be used to initialize the simulation engine, to influence a compilation process with a production code compiler, or to export production code information for use in other tools/process, like e.g. calibration and measurement information in ASAP2 format or AUTOSAR XML information.

In alternative embodiments, hardware-level code or a configuration for a programmable hardware device may be created from the blocks describing the control program.

Figure 4:
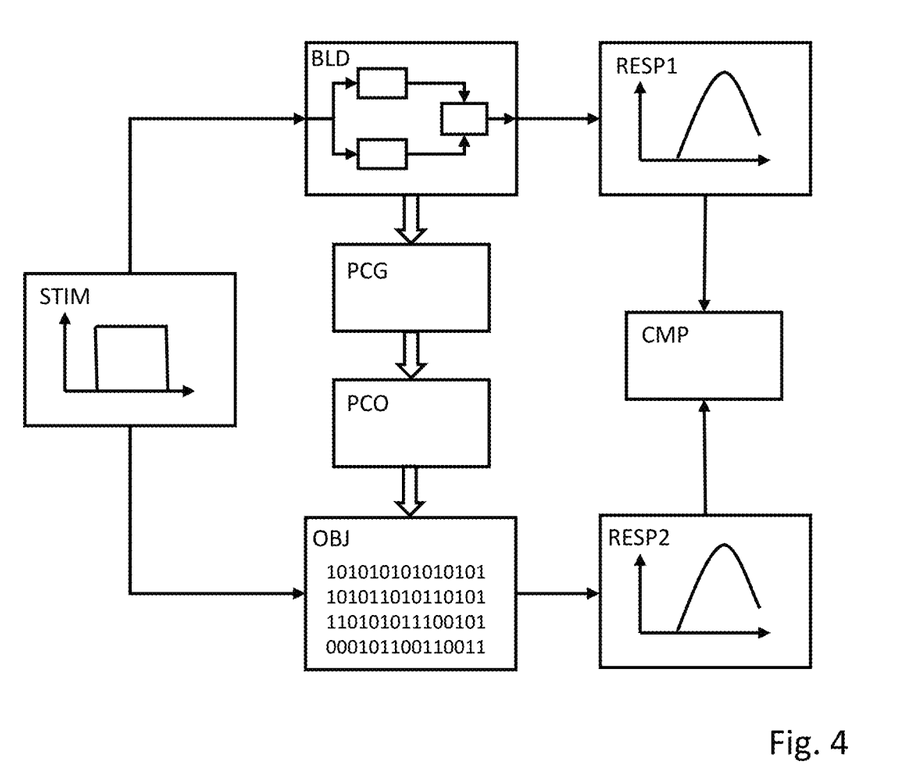
FIG. 4 is an exemplary diagram of a method for testing the compliance of the executable with a model specifying the desired behavior.

FIG. 4 displays an exemplary embodiment of a method for compiling and testing a control program.

The model editor MOD of the TCE can comprise a graphical user interface for modifying a block diagram BLD, which may comprise a plurality of blocks interconnected by signal paths. Each block may be an atomic block providing a specific functionality or it may represent a hierarchical block such as a subsystem, which comprise a plurality of subordinate blocks that are shown in a lower hierarchical level. Blocks may be connected by signals which may be of scalar or composite type and which can be represented by arrows indication the direction of the data flow. In the shown example, the block diagram comprises three blocks, an input port for receiving an input signal and an output port for sending an output signal. For example, the block diagram can describe the predetermined or intended behavior of a control program. Upon activation of the simulation engine in the technical computing environment, the block diagram BLD is executed and results are calculated for each time step. The block diagram may be interpreted directly or it may be converted to an intermediate form that allows for a faster execution in the simulation engine.

A number of test cases for the control program have been deduced from the specification and intended application of the control program. Advantageously, a test case comprises a stimulus STIM sent as an input signal to the control program and a corresponding response RESP received as an output signal from the control program. In the shown example, the stimulus STIM is represented by a diagram depicted a particular temporal behavior of the input signal. When the control program is executed in the simulation engine on the host computer, operations corresponding to the block diagram BLD are carried out for a plurality of time steps. During each time step, the current value of the stimulus STIM is fed to the appropriate input ports of the block diagram, the block diagram BLD is being executed in the simulation engine, so that signals are being manipulated and a new internal state of the model may be reached. By simulating the model given in the block diagram for a predetermined duration and by recording the output signal, a response RESP1 can be determined in a model-in-the-loop simulation. A model-in-the-loop simulation mode may be used for verifying that the block diagram executed in the simulation engine actually describes the intended behavior of the control program. All arithmetic calculations can be carried out with high-precision operations, e.g. using the floating-point data type double for the variables. As a result, the simulation is sufficiently accurate to use the recorded output signals as reference data.

Once correctness of the model has been established and reference data has been stored, the blocks corresponding to the control program are converted to program code via the production code generator PCG. The generated production code is then compiled to object code or an executable using the production code compiler PCO; an object code is binary data that contains instructions for a particular processor. When the object code is combined with additional information for the operating system of the host computer, an executable for the host computer is formed. Settings applied during the code generation may comprise a conversion to lower-precision operations that are computationally more efficient, e.g. integer instructions for fixed-point calculations, so that the control program later can be executed in real-time on the microcontroller of an embedded system.

In order to verify that the calculations of the generated code are sufficiently accurate and match the behavior of the blocks in the graphical model, a software-in-the-loop simulation or a processor-in-the-loop simulation may be carried out. The object code or the executable OBJ, which may be in the form of a DLL, contains calculations corresponding to the block diagram. During a predetermined duration, a stimulus STIM is fed to the object code or executable OBJ, and the output signals are recorded to obtain a response RESP2.

The response RESP1 of the model-in-the-loop simulation may be displayed on the host computer simultaneously with the response RESP2 of the generated code, so that a visual comparison may be performed by the user. Additionally or alternatively, the response RESP1 and RESP2 may be compared in a comparison tool, so that a number of checks for compliance to predetermined conditions may be carried out. The output signals can be compared point by point; for example, the absolute difference between a data point in RESP1 and the corresponding data point in RESP2 may be calculated. By comparing the differences to a threshold indicating a maximum permissible difference, the correctness of the optimizations applied when generating and compiling the code can be verified.

While a software-in-the-loop simulation may be useful for testing the general functionality, adapting the control function and/or assessing the performance of the control function in real situations can be performed using internal bypassing on a physical ECU.

Figure 5:
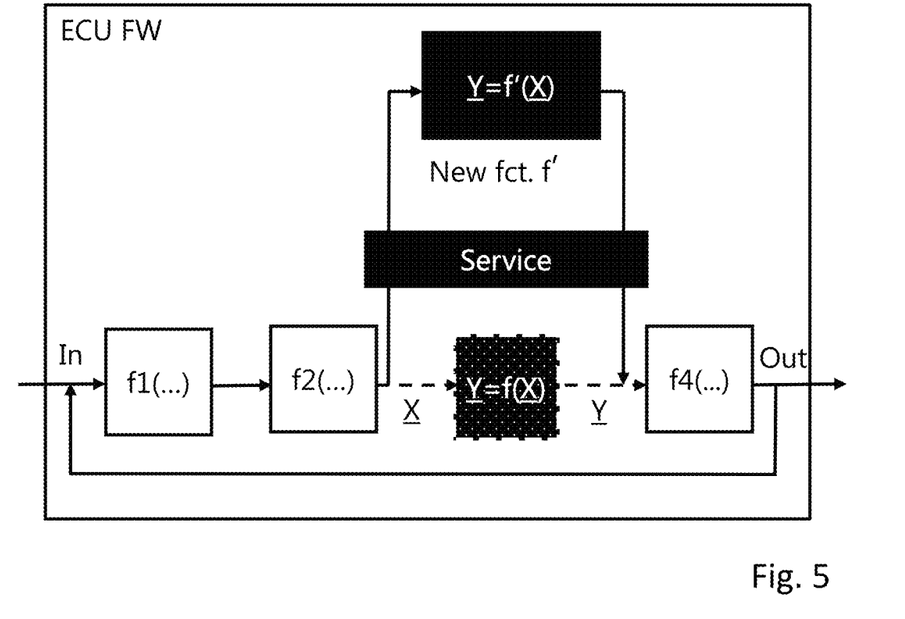
FIG. 5 is a schematic diagram of internal bypassing of an ECU function.

FIG. 5 illustrates internal bypassing of an ECU function in a schematic diagram of the ECU firmware (ECU FW). In the diagram, software components, such as functions, are indicated by boxes; data flow is indicated by arrows.

The functions in the ECU firmware are periodically executed; for each execution, one or more input variables (In) are received, and one or more output variables (Out) are calculated. The first function f1 receives the input variables and performs a calculation; the output variables of the first function f1 are transmitted to the second function f2. Generally, an output variable of a function may be identical to an input variable of the function or may depend in a complex manner on a plurality of different input variables. In the original ECU SW, a third function f(X) receives the output variables of the second function, here denoted by X, as input variables and calculates output variables Y. For internal bypassing, a service function (Service) is inserted in the ECU FW; the service function collects the input variables X and is adapted to call a bypass function (New fct.) f'(X) that produces new values for the output variables Y. Generally, the original third function f(X) may be executed in parallel to the bypass function; in that case, the service function is adapted to replace its output variables by the new values Y=f'(X) from the bypass function, so that a fourth function f4 can calculate its output based on the new values. In this example the output variables (Out) of the fourth function are output e.g. in order to control an actuator; as indicated by the second arrow, they may also be transmitted to the first function f1 in the next execution cycle.

Because the bypass function may need different or additional input variables than the original function it replaces, the service function may need to be adapted to each bypass function.

Figure 6:
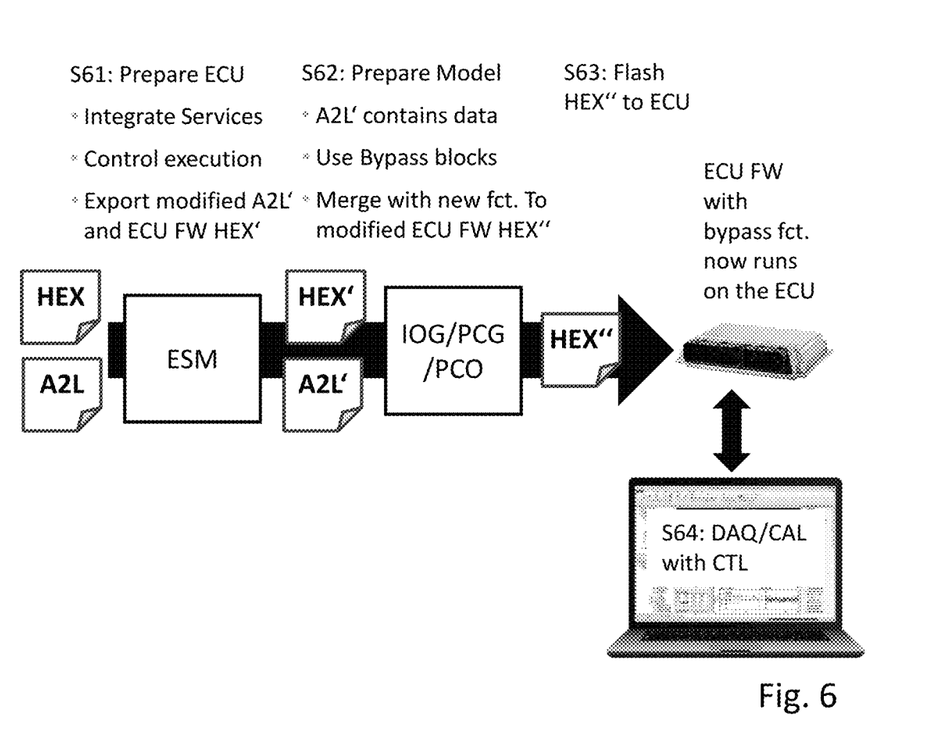
FIG. 6 is a schematic diagram of a method for preparing an ECU and performing internal bypassing.

FIG. 6 displays a schematic diagram of a method for preparing an ECU and performing internal bypassing.

Input data for the method are an image file HEX of the ECU firmware (ECU FW) and a measurement and calibration information file A2L; the A2L file comprises the addresses of functions and variables in the ECU firmware. Based on this information, a function in the ECU FW may be called and a variable of the ECU FW may be read or written.

The ECU service manager ESM receives the image file HEX and the information file A2L and prepares the ECU firmware in step S61 (Prepare ECU). The preparation can comprise adding a service function before and after an original ECU function that is to be replaced by a bypass function (Integrate Services). In a preferred embodiment, the service functions comprise a fixed hook that is adapted only to the microcontroller architecture, and an ECU-specific function that acts as a wrapper between the hook and a new control function. For this implementation, only the hook is inserted in step S61, whereas the ECU-specific function is generated and compiled during step S62. Alternatively, the service functions may only comprise ECU-specific source generated and compiled in step S62. In addition, the original ECU function may be instrumented for controlling the execution (Control execution). When the desired service functions have been inserted and any necessary execution control has been added, the ECU software manager exports the modified image file HEX' that comprises the inserted service functions and a modified information file A2L' in which e.g. any address information for parameters of the service functions has been added.

Figure 7:
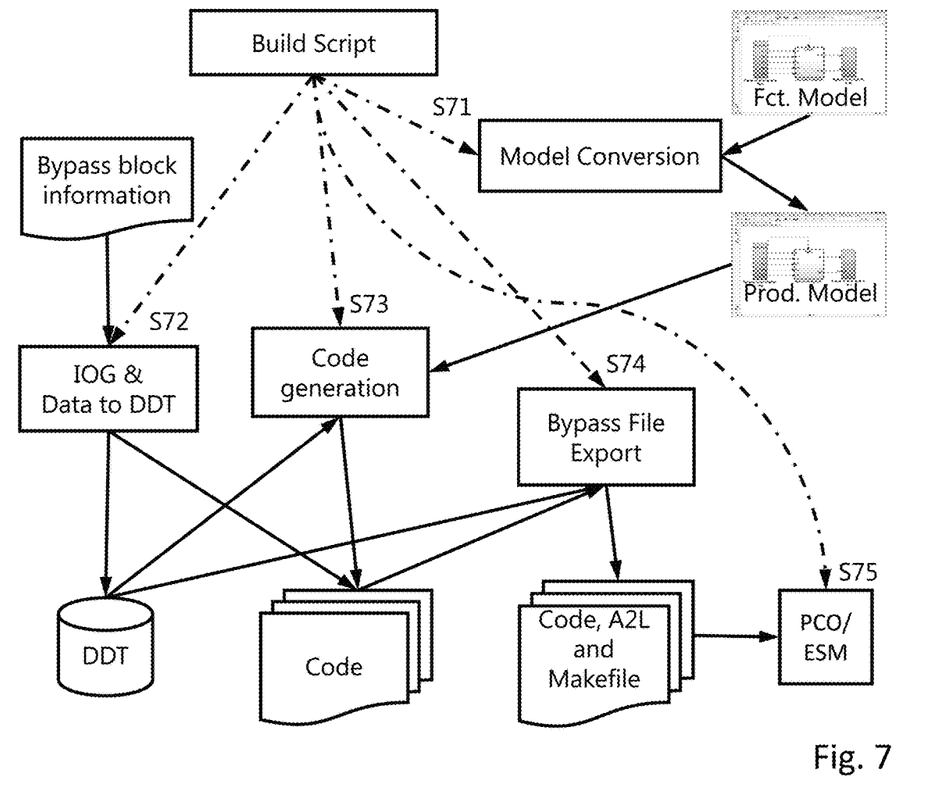
FIG. 7 is a schematic diagram of a method for generating code to be used in internal bypassing.

A new control function has been designed in the model editor and can be tested in a software-in-the-loop simulation. In step S62 (Prepare model), the newly designed control function is converted into a binary executable file adapted for execution by the microcontroller of the ECU. Referring to FIG. 7, generating code for the bypassing function based on the block diagram model is described in more detail below.

In step S63 (Flash HEX" to ECU) the modified image file HEX" comprising the bypassing function is written to a nonvolatile memory of the ECU. Once the ECU is restarted, both the original ECU firmware and the bypassing function are executed by the processor of the ECU.

A control computer, for example, a laptop, may be connected to the ECU; this may be done via a dedicated interface device adapted to the specific ECU. A control and measurement tool CTL running on the control computer may measure the values of one or more variables in the ECU firmware (data acquisition DAQ) and/or may change the value of one or more variables in the ECU firmware (calibration CAL) in step S64 (DAQ/CAL with CTL). Thus, the new control function may be fine-tuned for improved performance in a real-world use of the ECU.

FIG. 7 illustrates a method for generating code to be used in internal bypassing comprising an exemplary structure of involved software components. In the shown example, a build script invokes other software components, for example, via mechanisms of the technical computing environment. Transmitting data is indicated by full arrows, whereas invoking a further software component is indicated by a dash-dotted arrow.

The control function may be implemented as a function model (Fct. Model), or it may be implemented as a production model (Prod. Model) already comprising annotations for producing ECU code such as fixed-point calculations. In step S71 (Model Conversion), the build script optionally invokes a model conversion component. The model conversion may comprise annotating blocks based on information associated with signals or replacing blocks by one or multiple different blocks. The model conversion is mandatory for a functional model; for a production model, it may be omitted.

In step S72 (IOG & Data to DDT), the build script invokes an interface generator IOG comprising an import of auxiliary data in the data definition tool DDT. One or multiple files comprising bypass block information, for example, replacement descriptions for the bypass blocks, are retrieved. For example, the interface generator IOG can generate wrapper code for interfacing the newly designed control function to the service hook introduced in the ECU. Alternatively, the interface generator may produce a complete service function. In addition, the interface generator may generate code for accessing variables in the ECU firmware.

In step S73 (Code generation), the build script invokes the production code generator PCG. Based on the blocks of the bypass model and auxiliary information in the data definition tool, source code for the control function is generated. The source code may be optimized for readability and speed; it may include exclusively of fixed-point operations.

The functional code from the production code generator and the wrapper code may initially be stored in separate files. In step S74 (Bypass File Export), the build script invokes a software component that merges the corresponding code parts. As part of the merging process or in a separate software component, an information file (A2L) comprising information on variables and (sub-)functions in the bypass function (such as data types or relative addresses) is generated.

The code and corresponding additional information is transmitted to the production code compiler PCO and the ECU software manager ESM; these software components are invoked by the build script in step S75. The source code modules are compiled and linked to a binary executable file; the ECU software manager merges the existing ECU firmware with the binary executable file to a modified ECU firmware.

Figure 8:
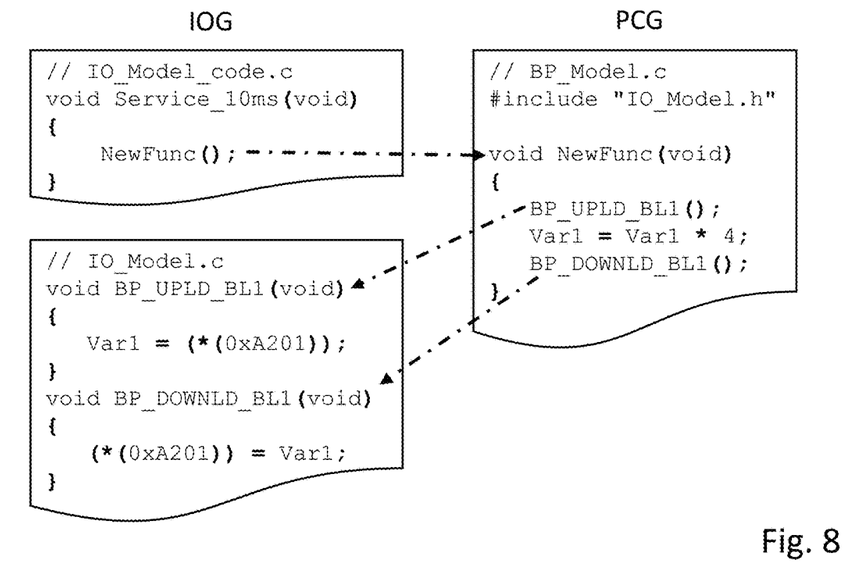
FIG. 8 is a schematic diagram of exemplary code units.

FIG. 8 displays a schematic diagram of exemplary code units. In this embodiment, code for a bypass block in the model is split in two separate parts: the production code generator PCG can generate functional code based on other blocks in the block diagram (such as a multiplication), but only a function call for the bypass block. During code generation, the bypass block is replaced by a placeholder like an override block; the placeholder or corresponding declaration code is then replaced by the function call from the data definition tool; or the further part of the code for the bypass block can be generated using the interface generator IOG. In the current example, this part is split into two pieces, a calling code for being called by the service hook on the ECU and the transfer code adapted to the current implementation of the ECU firmware, for example, specific address values for the variables. The interface generator may be based on code templates and does not need the optimization capabilities of the production code generator.

The calling relationship between the different parts and pieces is indicated by dash-dotted arrows.

Generally, a single code generator may be used for all parts of the code, and the functional code units may be statically predefined or dynamically generated based on predefined rules at replacement time.

Figure 9:
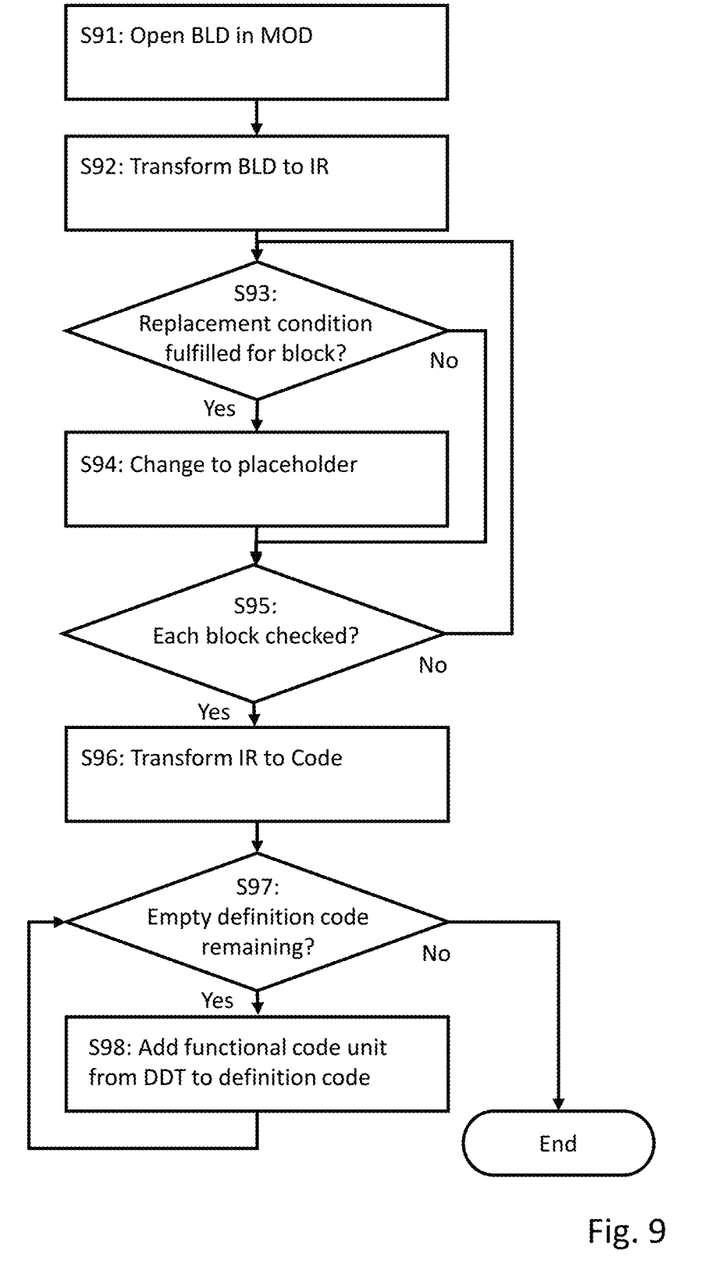
FIG. 9 is a schematic diagram of an embodiment of the inventive method for replacing blocks by predefined code.

FIG. 9 illustrates an embodiment of the inventive method for replacing blocks by predefined code.

In step S91 (Open BLD in MOD), the block diagram is opened in the model editor.

The block diagram is transformed to an intermediate representation in step S92 (Transform BLD to IR). This may include a first optimization of the block diagram or the intermediate representation based on generally known optimization rules as described above (cf. FIG. 3).

The replacement condition needs to be checked for the whole block diagram. In step S93 (Replacement condition fulfilled for block?), the processor checks if the replacement condition is fulfilled for the current block. When the replacement condition is fulfilled, the block is changed to a placeholder in step S94 (Change to placeholder). The placeholder may comprise an interface, i.e. a definition of input/output signals or variables, but it does not include a particular functionality such as a computation based on the input signals. In step S95 (Each block checked?), the processor checks if the replacement condition has been computed for each block in the block diagram—or each block in the relevant part of the block diagram, i.e. the part for which code is generated. Until this is the case, the processor picks a new block as current block.

Once the replacement condition has been checked for each block in the relevant part of the diagram, the intermediate representation is transformed to source code in step S96 (Transform IR to Code). Prior to this, the intermediate representation may be optimized once or multiple times based on generally known optimization rules as described above (cf. FIG. 3).

For those blocks that have been changed to a placeholder, the corresponding functional code unit needs to be inserted. In step S97 (Empty definition code remaining?), the processor checks if any block fulfilling the replacement condition has not yet been replaced by the corresponding functional code, but an "empty" interface definition needs to be filled.

When this is the case, the processor adds the corresponding functional code unit from the data definition tool to the generated source code in S98 (Add functional code unit from DDT to definition code). By separating this functional code unit from the rest of the block diagram, it can be changed irrespective of the current version of the code generator. Thus, a new version of a block library can always be fitted with new functional code while keeping a known code generator version.

The inventive method may be carried out in bypassing applications as described above; however, the replacement mechanism is generally applicable to code generation from block diagrams.

Those skilled in the art will appreciate that the order of at least some of the steps of the inventive method may be changed without departing from the scope of the claimed invention. While the present invention has been described with respect to a limited number of embodiments, those skilled in the art will appreciate numerous modifications and variations therefrom. It is intended that the appended claims cover all such modifications and variations as fall within the true spirit and scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for generating program code based on one or more blocks of a block diagram in a technical computing environment, an identifier being assigned to at least one or each of the one or more blocks of the block diagram, the technical computing environment comprising a model editor, a data definition tool and a code generator, the data definition tool comprising at least one functional code unit and a corresponding identifier, the technical computing environment being executed by at least one processor of a host computer, the method comprising:

opening the block diagram in the model editor;

converting the block diagram to an intermediate representation using the code generator;

checking if a replacement condition is fulfilled for a current block in the block diagram, the checking of the replacement condition comprising verifying that a functional code unit is assigned to the identifier of the current block;

replacing the current block by a placeholder containing input/output-definitions but no functionality when the replacement condition is fulfilled; and converting the intermediate representation to program code and adding the functional code unit assigned to the identifier of the current block from the data definition tool to a definition code that corresponds to the placeholder.

2. The method of claim 1, wherein the step of checking if a replacement condition is fulfilled additionally comprises determining that a particular operation mode of the code generator is selected.

3. The method of claim 1, wherein the step of checking if a replacement condition is fulfilled additionally comprises determining that the current block is a block of a predefined type.

4. The method of claim 1, wherein each block of the one or more blocks being the basis for the generation of program code is subsequently treated as current block for which the replacement condition is checked.

5. The method of claim 1, wherein the step of opening the block diagram in the model editor comprises adapting the block diagram based on at least one block adaption rule, wherein applying the block adaption rule to a first block comprises replacing the first block by a predefined second block in the block diagram and/or setting at least one property of the first block to a new value.

6. The method of claim 1, wherein at least one block used in the block diagram is part of a block library, wherein the block library comprises a replacement description, the replacement description comprising a functional code definition assigned to the block and a corresponding interface definition, wherein, prior to generating code, a replacement condition is determined based on the replacement description and a functional code unit is determined based on the functional code definition, and wherein at least the functional code unit is stored in the data definition tool.

7. A method for generating program code based on one or more blocks of a block diagram in a technical computing environment, an identifier being assigned to at least one or each of the one or more blocks of the block diagram, the technical computing environment comprising a model editor, a data definition tool and a code generator, the data definition tool comprising at least one functional code unit and a corresponding identifier, the technical computing environment being executed by at least one processor of a host computer, the method comprising:

opening the block diagram in the model editor;

converting the block diagram to an intermediate representation using the code generator and checking if an enhancement condition is fulfilled for a current block in the block diagram, wherein checking if the enhancement condition is fulfilled comprises verifying that a functional code unit is assigned to the identifier of the current block;

adding input/output-definitions to the parts of the intermediate representation corresponding to the current block when the enhancement condition is fulfilled; and converting the intermediate representation to program code and adding the functional code unit from the data definition tool to a definition code corresponding to the input/output-definitions, the definition code being generated in addition to code corresponding to the block functionality.

8. The method of claim 7, wherein the step of checking if an enhancement condition is fulfilled additionally comprises determining that a particular operation mode of the code generator is selected.

9. The method of claim 7, wherein the step of checking if an enhancement condition is fulfilled additionally comprises determining that the current block is a block of a predefined type.

10. The method of claim 7, wherein each block of the one or more blocks being the basis for the generation of program code is subsequently treated as current block for which the enhancement condition is checked.

11. A computer system, comprising: a host computer; and an electronic control unit, the electronic control unit comprising a microcontroller and a nonvolatile memory, the electronic control unit being connected to the host computer via a network interface, the host computer comprising a microprocessor, a random access memory, a graphics controller connected to a display, a serial interface connected to at least one human input device, and a nonvolatile memory, a hard disk, or solid state disk, the nonvolatile memory comprising instructions that, when executed by the microprocessor, cause the host computer to carry out a method according to claim 1.

12. A non-transitory computer readable medium containing instructions that, when executed by a microprocessor of a computer system, cause the computer system to carry out the method according to claim 1.

* * * * *